(12) United States Patent
Arguin

(10) Patent No.: US 7,999,681 B2
(45) Date of Patent: Aug. 16, 2011

(54) METHOD OF SHIPPING AND TRACKING INVENTORY

(75) Inventor: Paul R. Arguin, Andover, MA (US)

(73) Assignee: United Security Applications ID, Inc., East Windsor, NJ (US)

( * ) Notice: Subject to any disclaimer, the term of this patent is extended or adjusted under 35 U.S.C. 154(b) by 0 days.

(21) Appl. No.: 12/566,337

(22) Filed: Sep. 24, 2009

(65) Prior Publication Data

US 2010/0090803 A1    Apr. 15, 2010

Related U.S. Application Data

(63) Continuation of application No. 12/017,626, filed on Jan. 22, 2008, now Pat. No. 7,859,410, and a continuation-in-part of application No. 12/401,441, filed on Mar. 10, 2009, now abandoned.

(60) Provisional application No. 60/871,185, filed on Jan. 24, 2007, provisional application No. 61/100,502, filed on Sep. 26, 2008, provisional application No. 61/103,472, filed on Oct. 7, 2008.

(51) Int. Cl.
*G08B 13/14*    (2006.01)

(52) U.S. Cl. ................................. 340/572.1; 340/10.5
(58) Field of Classification Search .... 340/572.1–572.9, 340/10.1–10.6
See application file for complete search history.

(56) References Cited

U.S. PATENT DOCUMENTS

| | | | |
|---|---|---|---|
| 5,729,200 A | 3/1998 | Copeland et al. | |
| 6,181,245 B1 | 1/2001 | Copeland et al. | |
| 6,563,417 B1 * | 5/2003 | Shaw | 340/572.1 |
| 2004/0201478 A1 * | 10/2004 | Reid et al. | 340/572.1 |
| 2004/0263319 A1 * | 12/2004 | Huomo | 340/10.2 |
| 2005/0098620 A1 * | 5/2005 | Dunlap | 340/572.1 |

* cited by examiner

*Primary Examiner* — Thomas J Mullen
(74) *Attorney, Agent, or Firm* — McCormick, Paulding & Huber LLP

(57) ABSTRACT

A universal tracking assembly that is capable of supporting more than one protocol used in electronic article surveillance (EAS) labels. The universal tracking assembly includes an acousto-magnetic (AM) EAS portion with a Radio Frequency (RF) EAS portion. The intrinsic characteristics and properties of the components of these individual labels are utilized to enhance the overall performance and utility of the combined EAS universal tracking assembly.

11 Claims, 8 Drawing Sheets

METHOD OF SHIPPING AND TRACKING INVENTORY

CROSS-REFERENCE TO RELATED APPLICATIONS

This application claims the benefit of U.S. Provisional Application No. 60/871,185, filed Jan. 24, 2007, entitled "UNIVERSAL TRACKING SYSTEM", U.S. application Ser. No. 12/017,626, filed on Jan. 22, 2008, now U.S. Pat. No. 7,859,410 entitled "UNIVERSAL TRACKING ASSEMBLY", U.S. Provisional Application No. 61/100,502, filed on Sep. 26, 2008, entitled "MULTIPLE PROTOCOL TRACKING ASSEMBLY," U.S. Provisional Application No. 61/103472, filed on Oct. 7, 2008, entitled "UNIVERSAL TRACKING SYSTEM" and U.S. application Ser. No. 12/401,441, filed on Mar. 10, 2009 entitled "UNIVERSAL TRACKING ASSEMBLY", all of which are hereby incorporated by reference in their entireties.

FIELD OF INVENTION

The present invention relates, in general, to a method of shipping and tracking inventory, and deals more particularly with a method of shipping and tracking inventory in which at least one type of EAS tag is selected for use on a product to be shipped based on relevant shipping criteria.

BACKGROUND OF THE INVENTION

Bar codes are commonly utilized throughout the commercial and retail worlds in order to accurately determine the nature, cost and other vital data of an individual item. Bar codes, however, are purely passive constructs, and therefore cannot offer or transmit information themselves, instead relying upon known bar code readers to scan and interpret the information stored in the bar code itself. Moreover, the information content of bar codes is static, and cannot be changed or supplemented at will once the bar code is fabricated.

In recent years, differing electronic article surveillance (EAS) platforms/tags have been developed to address the shortcomings of known bar code systems. One such type of EAS is radio frequency identification (RFID) platforms/tags. RFIDs are small (typically) battery-less microchips that can be attached to consumer goods, cattle, vehicles and other objects to track their movement. RFID tags are normally passive, but are capable of transmitting data if prompted by a reader. The reader transmits electromagnetic waves that activate the RFID tag. The tag then transmits information via a predetermined radio frequency, or the like. This information is then captured and transmitted to a central database for suitable processing.

An RFID system typically is made up of a transponder, or tag, which is an integrated circuit (IC) connected to an antenna, which is then generally embedded into labels, a reader which emits an electromagnetic field from a connected antenna, and an enterprise system. The tag draws power from the reader's electromagnetic field to power the IC, and broadcasts a modulated signal which the reader picks up (via the antenna), decodes, and converts into digital information that the enterprise system uses.

There are two main types of RFID devices, including an inductively coupled RFID tags (otherwise known as high frequency (HF) tags). Typically, there are three main parts to an inductively coupled RFID tag:
Silicon microprocessor—These chips vary in size depending on their purpose;
Metal coil—Made of copper or aluminum wire that is wound into a circular pattern on the transponder, this coil acts as the tag's antenna. The tag transmits signals to the reader, with read distance determined by the size of the coil antenna. These coil antennas can operate at 13.56 MHz; and
Encapsulating material—glass or polymer material that wraps around the chip and coil.

Inductive RFID tags are powered by the magnetic field generated by the reader. The tag's antenna picks up the magnetic energy, and the tag communicates with the reader. The tag then modulates the magnetic field in order to retrieve and transmit data back to the reader. Data is transmitted back to the reader, which directs it to the host computer and/or system.

Inductive RFID tags are very expensive on a per-unit basis, costing anywhere from $1 for passive button tags to $200 for battery-powered, read-write tags. The high cost for these tags is due to the silicon, the coil antenna and the process that is needed to wind the coil around the surface of the tag.

Another type of known RFID are capacitively coupled RFID tags. These tags do away with the metal coil and use a small amount of silicon to perform the same function as a inductively coupled tag. A capacitively coupled RFID tag also has three major parts:
Silicon microprocessor—Motorola's BiStatix RFID tags use a silicon chip that is only 3 $mm^2$. These tags can store 96 bits of information, which would allow for trillions of unique numbers that can be assigned to products;
Conductive carbon ink—This special ink acts as the tag's antenna. It is applied to the paper substrate through conventional printing means; and
Paper—The silicon chip is attached to printed carbon-ink electrodes on the back of a paper label, creating a low-cost, disposable tag that can be integrated on conventional product labels.

By using conductive ink instead of metal coils, the prices of capacitively coupled tags are as low as 50 cents. These tags are also more flexible than the inductively coupled tag. Capacitively coupled tags can be bent, torn or crumpled, and can still relay data to the tag reader. In contrast to the magnetic energy that powers the inductively coupled tag, capacitively coupled tags are powered by electric fields generated by the reader. The disadvantage to this kind of tag is that it has a very limited range.

As the two preceding examples of known RFID devices indicate, there does not presently exist an industry-standard RFID protocol. With different manufacturers utilizing different RFID devices on their disparate products, large department stores, warehouses and/or shipping containers often contain a plurality of differing RFID devices.

It will therefore be readily appreciated that a large retail seller or shipper having many different products, each with different RFID devices attached thereto, may have great difficulty in matching the proper reader and associated protocol with the appropriate RFID tag, during an attempted interrogation of the RFID tag.

It is therefore necessary for retail establishments and shippers to purchase and employ multiple RFID readers and protocols, in order to ensure that every item in their inventory has been properly interrogated and categorized, as appropriate, and in accordance with the particular type of RFID device attached thereto. This undesirable duplication of readers and related machinery, and protocols, is obviously complex and costly.

Still further, known RFID devices are designed so that they may continue to communicate with extraneous readers well after the time of initial purchase. That is, known RFID devices are designed so that tracking of an item can be accomplished from the time the item leaves the factory, until it rests within the residential dwelling of its purchaser.

The very attributes, however, of known RFID devices that permit these devices to continue to operate and communicate with a reader well after the time of initial purchase, also pose problems for closely nested commercial or retail facilities.

For example, once a purchaser buys an item at a store, the RFID device will communicate with an integrated reader at the checkout. The reader will detect and interrogate the RFID device, and thereafter permit the purchaser to exit the store without setting off an alarm for shoplifting. But because of the resilient nature of the RFID devices, these devices continue to be passively 'active' even if the purchaser goes into another retail establishment, as often happens in a mall or shopping center environment. Once the original purchaser leaves the second retail store, the RFID detection equipment in the second store may awaken the RFID tag, and erroneously alert the security system of the second store. This scenario is only worsened by the differing RFID devices and protocols that currently exist in the market.

In addition to the differing RFID technologies mentioned above, other EAS technologies exist having their own operational protocols, such as acousto-magnetic (AM) EAS circuitry. Similar to the problems noted above, the problem for, e.g., manufacturer is the uncertainty of knowing which EAS technology will be employed at various stages of the manufacture, transportation and inventory of items equipped with one of the many differing EAS technologies.

It will therefore be appreciated that the primary EAS protocols in place are the acousto-magnetic (AM) type and the RF type, as discussed above. These differing EAS protocols are each independently used by various major retailers and are currently not compatible technologies. Thus, a manufacturer/distributor must maintain separate inventories of their products for the different EAS protocols incurring the added cost in doing such a practice or the manufacturer/distributor must apply both tags/labels to each of their products incurring the added cost of this alternative practice.

With the forgoing problems and concerns in mind, it is the general object of the present invention to provide a universal tracking system that is capable of harmonizing the use of differing EAS technologies/devices by integrating more than one such technology on a common susbstrate/patform. More preferably, it is the general object of the present invention to provide an integrated EAS label/tag assembly, which is compatible with both AM type and RF (including RFID) systems. The invention more preferably includes the AM type transponder which is composed of one or more amorphous alloy strips with a high magnetic permeability and a magnetic biasing strip which can be cast, die cut, painted, printed, etc. The amorphous strip(s) are packaged such that it (they) can freely resonate and is (are) sized to resonate at the desired frequency of standard AM type EAS.

SUMMARY OF THE INVENTION

It is one object of the present invention is to provide a universal tracking assembly.

It is another object of the present invention is to provide a universal tracking assembly that is capable responding to more than one EAS interrogation protocols.

It is another object of the present invention is to provide a universal tracking assembly that integrates differing EAS identification technologies upon a common platform.

It is another object of the present invention is to provide a universal tracking system that integrates both RF and AM EAS identification technologies upon a common platform.

It is yet another object of the present invention to provide a combined electronic article surveillance (EAS) tag/label assembly which is capable of being detected by, and of responding to, interrogation by either AM or RF technologies/protocols.

It is yet another object of the present invention to provide a combined electronic article surveillance (EAS) tag/label which is capable of utilizing at least one common element in support of the combined AM and RF technologies/protocols.

It is yet another important aspect of the present invention to provide a combined EAS tag/label wherein the biasing magnet of the AM circuitry is integrated into both the AM and RF circuitry, thereby affecting the capacitance of the combined EAS tag/label.

It is yet another important aspect of the present invention to provide a combined EAS tag/label wherein the biasing magnet of the AM circuitry is positioned adjacent the inductive coil of the RF circuitry, thereby affecting the capacitance of the combined EAS tag/label.

Thus, it is an object of the present invention is to make a hybrid (i.e., combined) and selectively deactivatable EAS tag/label that can be detected by both AM EAS detectors and RF EAS detectors (also including RFID). The manufacture/design of this hybrid EAS tag/label is such that the intrinsic properties of the components enhance the performance of the overall hybrid label/tag and that the manufacturing efficiencies allow for a less expensive EAS solution for the manufacturer/distributor.

These and other objectives of the present invention, and their preferred embodiments, shall become clear by consideration of the specification, claims and drawings taken as a whole.

DETAILED DESCRIPTION OF THE PREFERRED EMBODIMENTS

Known EAS assemblies, such as RFID tags, can be either active or passive. Active RFID tags include a battery, or the like, and so are capable of transmitting strong response signals even in regions where the interrogating radio frequency field is weak. Thus, an active RFID tag can be detected and transmit at a greater range than is possible with a passive RFID. Batteries, however, are limited in their operable lifetime, and add significantly to the size and cost of the tag. A passive tag derives the energy needed to power the tag from the interrogating radio frequency field, and uses that energy to transmit response codes by modulating the impedance the antenna presents to the interrogating field, thereby modulating the signal reflected back to the reader antenna. Thus, their range is more limited.

Even within known passive RFID tags, there exists significant differences in performance, including significant differences in the performance of their associated antennas and corresponding interrogation and response ranges. While one embodiment of the present invention will be hereafter described in connection with passive tags, it will be readily appreciated that the teachings of the present invention are equally applicable to active tags.

Figure 1:
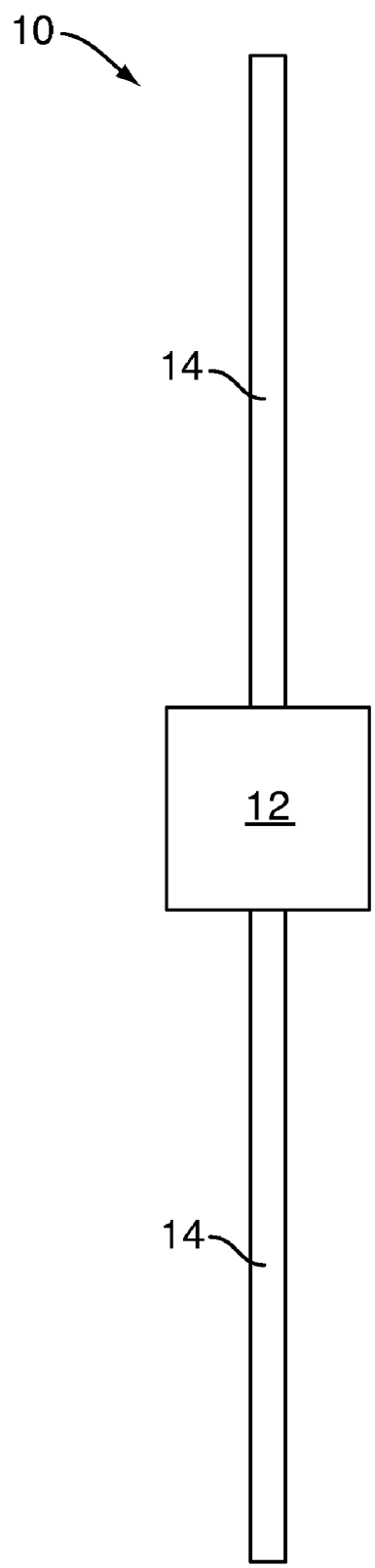
FIG. 1 schematically illustrates a known RFID EAS assembly.

FIG. 1 illustrates one version of a passive RFID 10, which typically includes an integrated circuit 12 and an antenna 14. The integrated circuit 12 provides the primary identification function. It includes software and circuitry to permanently (or semipermanently) store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only).

Figure 2:
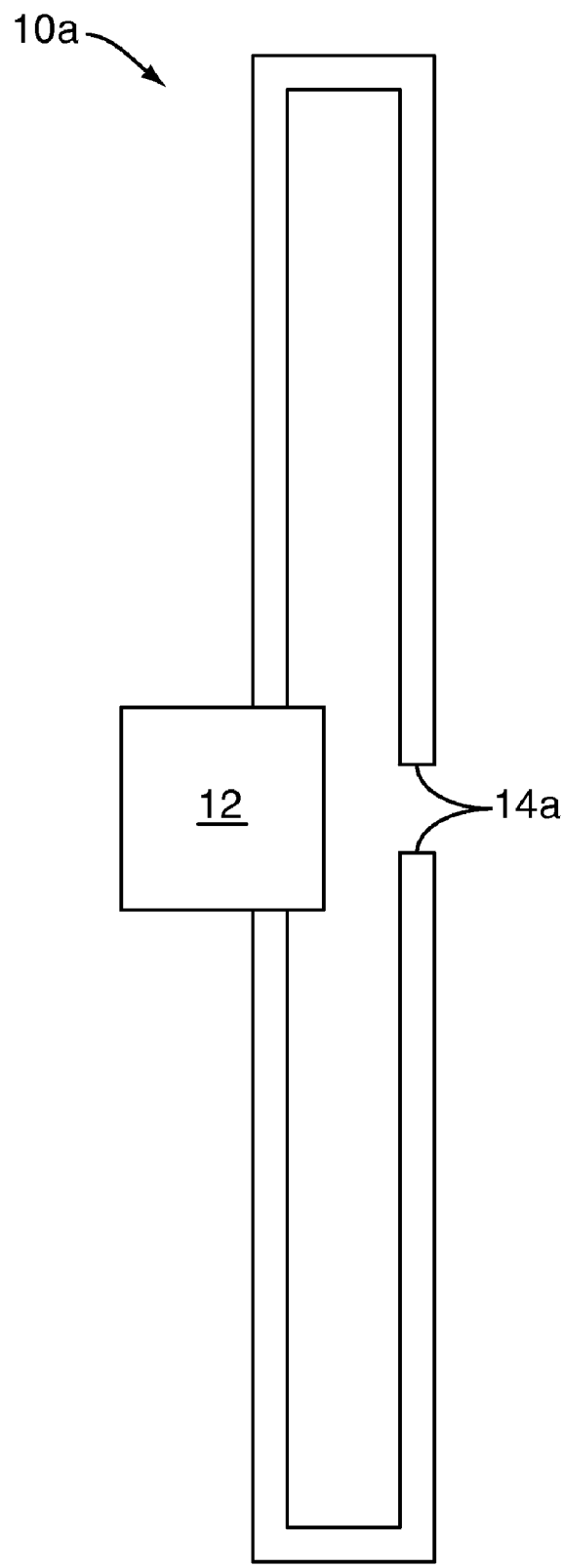
FIG. 2 schematically illustrates another known RFID EAS assembly.
Figure 3:
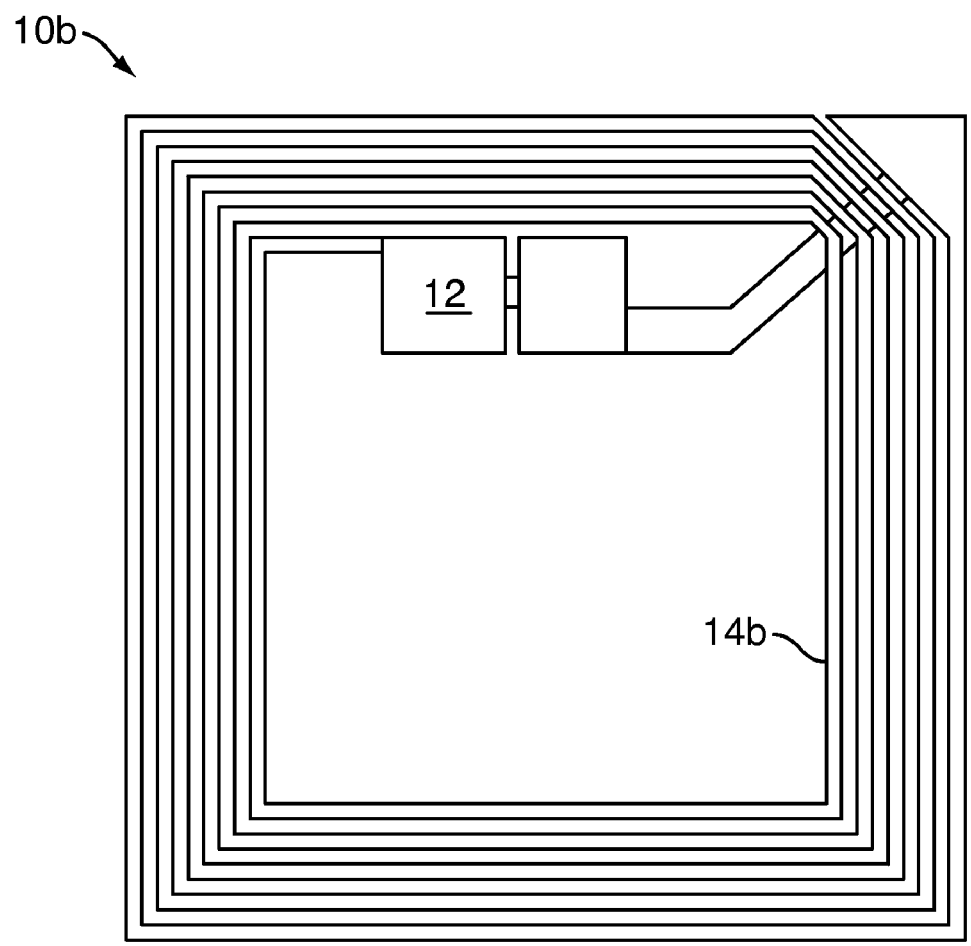
FIG. 3 schematically illustrates another known RFID EAS assembly.

The antenna geometry and properties depend on the desired operating frequency of the RFID portion of the tag. For example, 2.45 GHz (or similar) RFID tags would typically include a dipole antenna, such as the linear dipole antennas 14 shown in FIG. 1, or the folded dipole antennas 14a shown attached to the passive RFID 10a in FIG. 2. A 13.56 MHz (or similar) RFID tag would use a spiral or coil antenna 14b, as shown in the RFID 10b of FIG. 3. The RFID 10b of FIG. 3 may also include a capacitor 16 to increase the performance of the tag. Regardless of the particular design, the antenna 14 intercepts the radio frequency energy radiated by an interrogation source. This signal energy carries both power and commands to the tag. The antenna enables the RF-responsive element to absorb energy sufficient to power the IC chip and thereby provide the response to be detected. Thus, the characteristics of the antenna must be matched to the system in which it is incorporated. In the case of tags operating in the high MHz to GHz range, the most important characteristic is the antenna length. Typically, the effective length of a dipole antenna is selected so that it is close to a half wavelength or multiple half wavelength of the interrogation signal. In the case of tags operating in the low to mid MHz region (13.56 MHz, for example) where a half wavelength antenna is impractical due to size limitations, the important characteristics are antenna inductance and the number of turns on the antenna coil. For both antenna types, good electrical conductivity is required. Typically, metals such as copper or aluminum would be used, but other conductors, including magnetic metals such as permalloy, are also acceptable.

Figure 4:
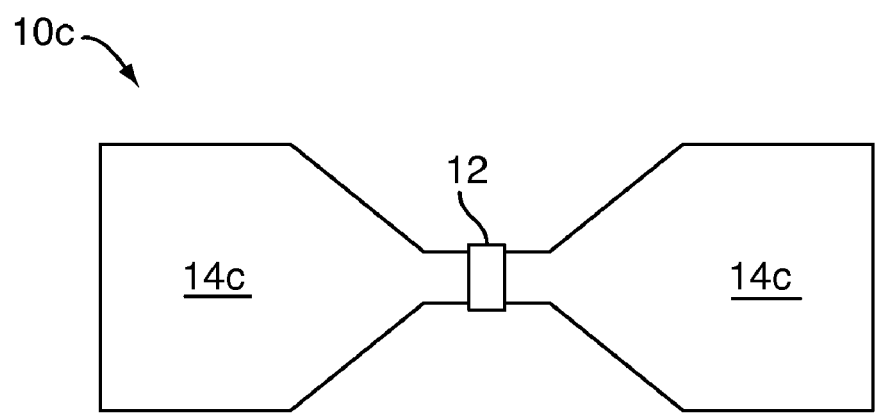
FIG. 4 schematically illustrates another known RFID EAS assembly.

FIG. 4 illustrates a passive RFID tag 10c which utilizes a conductive ink portion 14c to act as the antenna for the RFID 10c. Although less expensive to fabricate than RFID tags that include a wound wire antenna array, the conductive ink antenna 14c is limited in range and power.

In sum, therefore, there exists several differing types of RFID tags, which can either incorporate a magnetically responsive element, or a RF responsive element. As will be understood, each of these differing types of tags require differing interrogation devices and protocols so as to effectively interact with each tag type. This situation is difficult for large retailers, or the like, who inevitably accept products from a vast array of manufacturers utilizing differing RFID tag types.

Figure 5:
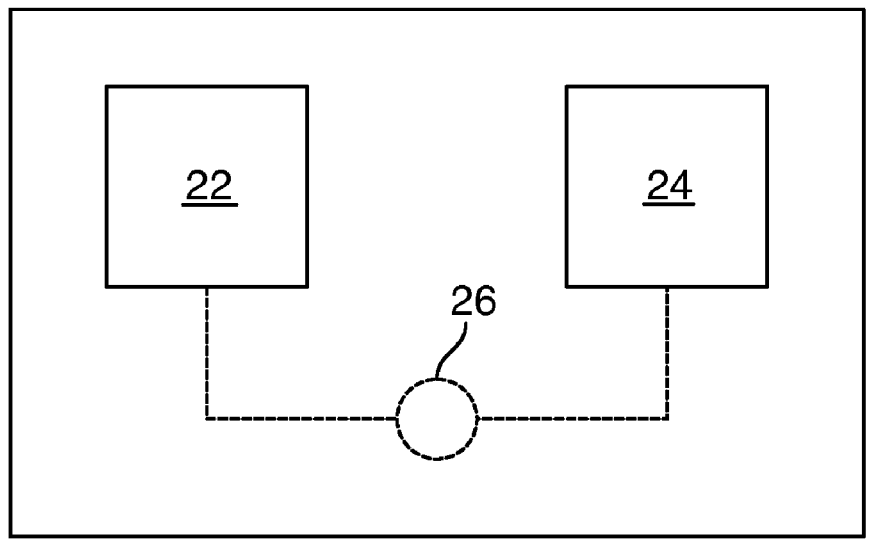
FIG. 5 schematically illustrates an integrated RFID EAS assembly according to one embodiment of the present invention.

FIG. 5 illustrates, therefore, one embodiment of the present invention. As shown in FIG. 5, a single, integrated RFID tag 20 includes both a magnetically-responsive RFID 22 and an RF-responsive RFID 24. When so coupled on a single RFID tag, these two RFID tag-types ensure that whatever type of interrogation device is employed by a user or, e.g., a retail store, the system will be able to communicate with at least one of the tags 22/24.

It is therefore an important aspect of the present invention that more than one type of RFID be integrated into a single RFID tag. By doing so the present invention ensures that regardless of the interrogation system utilized at or in any particular location, at least one of the integrated RFID tags will respond to the interrogation with the required information. Thus, a retail store need only buy a single interrogation system, without fear of not being able to communicate with those items having RFID tags of differing types.

It will be readily appreciated that the present invention is not limited to the integration of magnetically-responsive RFIDs and RF-responsive RFIDs together, and extends to the integration of RFID tags of any known, or to be discovered, type.

It is a further object of the present invention that significant elements present in one RFID tag may be universally utilized with respect to the other integrated RFID tags present on the integrated RFID tag 20. For example, should the integrated RFID tag 20 support both the RFID tags of FIGS. 3 and 4, the RFID tag of FIG. 4 could utilize the antenna 14b of the RFID tag in FIG. 3, thereby increasing the range of the conducive-ink RFID tag illustrated in FIG. 4.

It will be readily appreciated that the common use of a single component between differing RFID tags is not limited to the sharing of an antenna element. Indeed, the present invention equally contemplates the shared use of any component found in any RFID tag that are jointly mounted on a unitary platform.

FIG. 5 illustrates the shared use of a battery, or power supplying element, 26 with both of the RFIDs 22/24. The use of a shared or common power source 26 effectively removes the range limitations associated with certain types of RFID tags, as well as being more economically practical than providing a separate power source for each of the integrated RFIDs.

As discussed previously, large retailers, or the like, often accept merchandise from a variety of manufacturers who may be located at disparate points around the world. Each of these individual manufacturers may place an RFID tag of their choosing on the item as it is produced. This item is then transported by a shipper who may also place another RFID tag on the item, in accordance with the particular RFID system/configuration the shipper utilizes. Finally, the retailer itself may place yet another RFID tag on the item, again of its own choosing and configuration, and one which operates well with the interrogation system employed by the retailer.

In sum, any given item may have a plurality of differing RFID tags located, glued or otherwise attached thereto. Thus, while the retailer may deactivate their RFID tag placed on the item as the customer leaves the store, a problem exists when the retailer's deactivation system does not communicate with the other types of RFID tags that may also be located in or on the item.

When one or more of the additional RFID tags on a given item are not suitably deactivated, owing to their differing configurations and protocols, it is possible that the consumer may walk into another, non-affiliated store with the first item purchased, only to have the non-deactivated RFIDs set off the security system of the second store.

Figure 6:
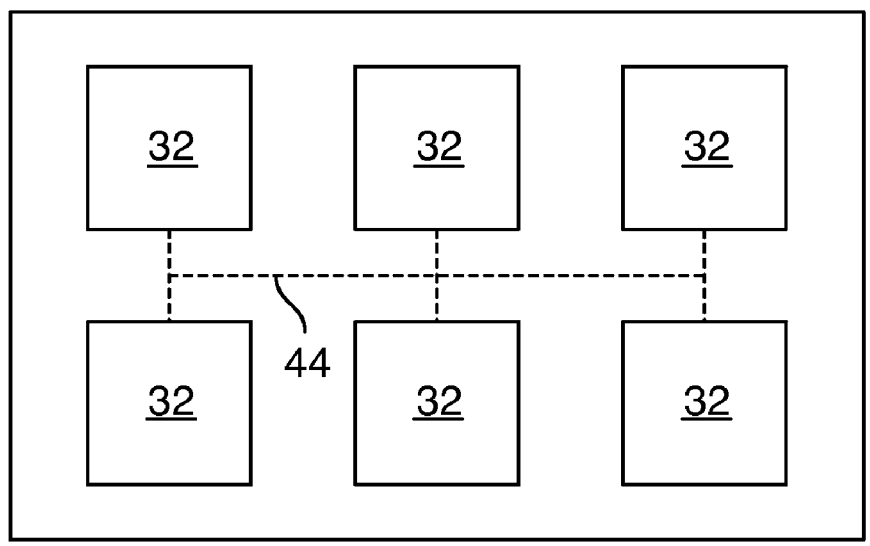
FIG. 6 schematically illustrates an integrated RFID EAS assembly according to another embodiment of the present invention.

The integrated nature of the RFID tag 20 shown in FIG. 5 removes the possibility of any such erroneous indications of shoplifting, or the like, caused by the non-deactivated RFID tags. FIG. 6 illustrates an integrated RFID tag 30, supporting an array of six differing RFID tags 32. It will be readily appreciated that there be more or less RFID tags 32 formed on the integrated RFID tag 30, without departing from the broader aspects of the present invention.

Figure 7:
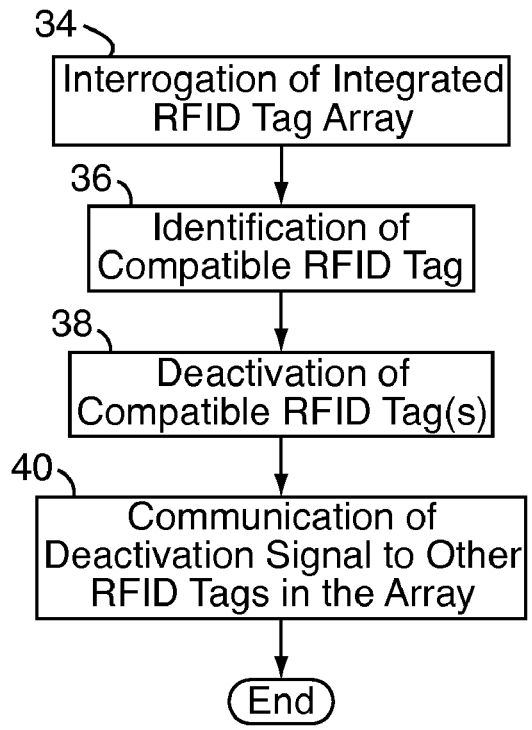
FIG. 7 illustrates a flow diagram pertaining to the integrated RFID EAS assembly of FIG. 6.

FIG. 7 is a flow diagram illustrating the operation of the integrated RFID tag 30 shown in FIG. 6. As depicted in step 34, an interrogator (such as one of the known RFID readers) is utilized to scan or interrogate the RFID tag 32. The interrogator then identifies one or more RFID tags 32 present in the array which are compatible with the technology of the interrogator, in step 36. The interrogator will then issue a command or signal to deactivate those RFID tags in the array which are compatible with the interrogator, as depicted in step 38. Following this, in step 40, the deactivation signal is communicated internally of the RFID tag 30, to the non-deactivated RFID tags 32, thereby deactivating all of the RFID tags 32, regardless of their configuration or protocol. After the communication of the deactivation signal to the other RFID tags in the array to complete deactivation, the process ends at step 42.

It is therefore another important aspect of the present invention that the integrated nature of the RFID tag 30 enables the complete deactivation of all of the RFID tags 32 anytime when the interrogator is capable of deactivating even one of the RFID tags 32 in the array. Thus, once a consumer purchases an item, and the interrogation system employed by the retail store deactivates the store RFID, the present invention ensures that all other RFIDs (or other types of EAS assemblies, as discussed in more detail later) in the array will also be deactivated. Erroneous indication of shoplifting or the like, as the consumer moves from store to store with a previously purchased item, are thereby avoided.

The communication between the RFID tags 32 may be accomplished through a direct electrical connection, or filament, 44 (as shown in FIG. 6), or via electromagnetic coupling, such as parasitic coupling, capacitive coupling or inductive coupling.

When employing the combined (or, integrated) RFID tag 30 in accordance with the present invention, none of the existing industries or retail stores need change the protocol by which they interrogate their combined RFID tags, regardless of the technology underpinning each of the differing RFID circuitry supported thereon. That is, regardless of the interrogation or reader apparatuses utilized by the various manufacturing and retail outlets, an integrated and combined EAS tag assembly will always have at least one type of RF circuitry that is capable of communicating with the respective interrogator or reader.

Given the differing technologies currently utilized by various manufacturers of RFID EAS tags, and the anticipated continuing evolution of technology in this area, the integrated RFID tag of the present invention effectively mimics a universal standard of RFID technology and related interrogators/readers, which does not currently exist. Thus, until such a standard is accepted worldwide, the integrated RFID tag of the present invention provides a platform upon which to mask the differences between the competing RFID technologies.

Other embodiments of the present invention can be visualized by a review of the foregoing. As to the integrated RFID tag 20 shown in FIG. 5, the present invention equally contemplates that the deactivation signal communicated to either the RFID 22 or 24 is likewise communicated to the common power source 26. By changing the state of the power source, the deactivation of the RFID 22 will effectively also deactivate the RFID 24.

FIGS. 5-7 therefore exhibit related embodiments of a combined EAS assembly having a plurality of RFID technologies integrated thereon. Thus, the combined EAS assemblies shown in FIGS. 5-7 are capable of responding to interrogation by differing RFID protocols.

Figure 8:
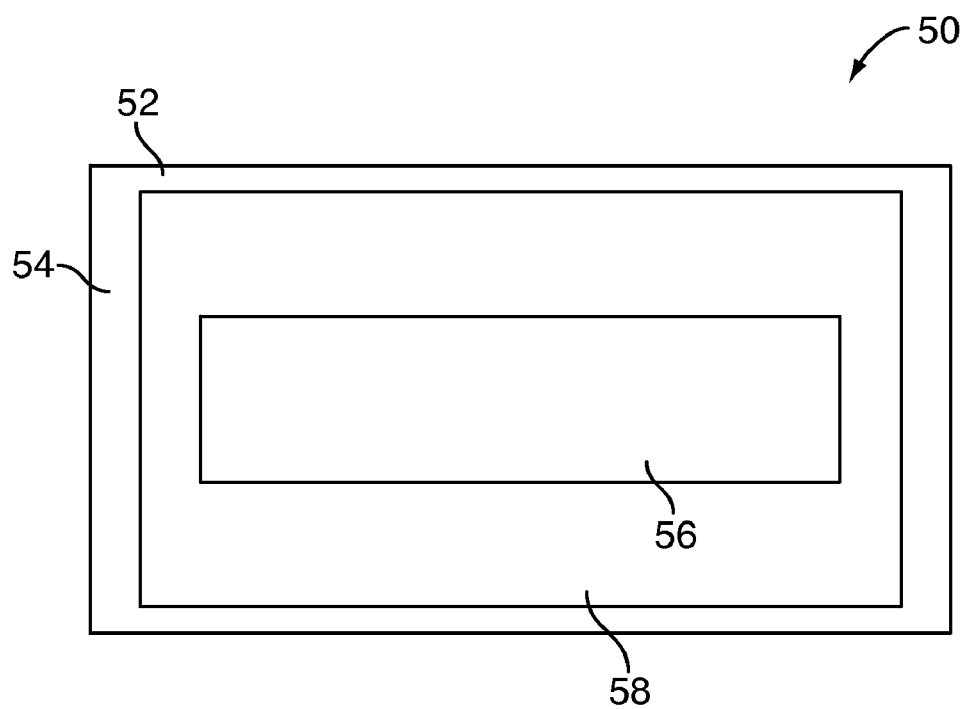
FIG. 8 illustrates a top plan view of a combined EAS tag/label assembly exhibiting integrated AM and RF components, according to a preferred embodiment of the present invention.
Figure 9:
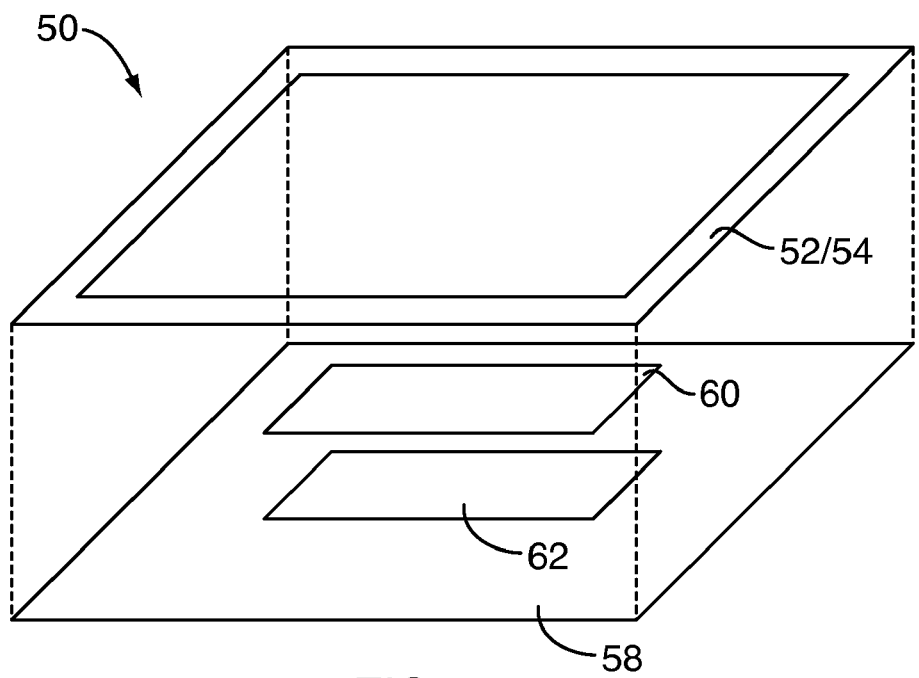
FIG. 9 illustrates a side view of the combined EAS tag/label assembly shown in FIG. 8.

In yet another, preferred, embodiment of the present invention, a combined EAS assembly 50 is shown in FIGS. 8-9. As shown in FIGS. 8-9, the combined EAS assembly 50 integrates both AM and RF components and technologies in a single, combined and universal EAS tag/label assembly.

The combined EAS tag assembly 50 includes a first portion 52 of a RF component which exhibits inductance, a second portion 54 of a RF component which exhibits capacitance, a third multi-layer portion 56 of an AM component including a resonator and a bias magnet, and a fourth portion 58 acting as the substrate and backing of the combined EAS tag 50. As shown in FIG. 9, the third multi-layer portion 56 includes an amorphous resonator 60 and a bias magnet 62.

Known RF resonators are typically configured as a LC Tank circuit, typically consisting of simply an inductor and capacitor(s). In contrast, the EAS tag assembly 50 will capture the resonant frequency of both the RF and AM components of the label and allow for a space in the center of the RF circuit to place the AM type label. The AM portion can be placed at various locations on the RF circuit, but interactions have to be accounted for and the RF portion must be tuned. Placing the AM components in the center of an open space in a RF circuit will primarily affect the inductance. Placing the AM portion in other locations could affect inductance, depending on the means of attaching or the dielectric, and certainly capacitance. Either way, once the AM portion is positioned in an inactive state, the RF portion is designed around the AM components and tuned to accommodate the interaction for any capacitance or inductance effects. This tuning will account for center frequency and the quality of the circuit.

The RF circuit components can be produced by various manufacturing methods such as die cutting, laser cutting, hot foil printing, embossing, printing with conductive inks, etc . . . . The method of manufacture is secondary in importance to the design of the RF portion of the combined EAS tag assembly 50. The means and location of the AM circuitry portion in relation to the RF circuitry portion will effect the advantage of shielding properties. The RF label component in accordance with the embodiment shown in FIGS. 8-9 can therefore be generally formed or stamped out of a material and forming the LC tank circuit which resonates at the desired frequency. The LC tank circuitry may itself be formed by layering "foils" (or inks, etc.) with designed dielectrics to form the inductor and plate capacitors.

It is therefore another important aspect of the present invention that the RF subsystem of the EAS tag assembly/label 50 is formed in a way and with specific materials that the combined EAS tag/label assembly 50 resonates at the appropriate frequency as an AM label would.

Similar to known AM labels, the AM subsystem of the EAS tag assembly 50 will continue to include the bias magnet 62, one or more resonators 60 cut from an amorphous alloy such as MetGlas (Metglas 2826MB3 has been used, however it will be readily appreciated that the present invention is not limited by this particular alloy), and packaging to allow for magnetorestriction and resonance.

It is therefore another important aspect of the present invention that the design of the EAS tag assembly 50 allows for at least one of these AM circuit components to be part of the RF circuit. The balance/tuning of the AM subsystem is effected at least in part by the inclusion of additional resonators and shaping of the primary to not only effect the inductance and capacitance of the RF subsystem, but contribute to the resonance of the AM subsystem. These AM circuit components may also be produced by a variety of manufacturing methods and may include die cutting, printing the bias magnet, etc. It will be readily appreciated that the specific method of manufacture either the RF or AM components of the EAS tag assembly 50 is secondary to the design of the combined EAS tag assembly 50, and that the present invention is not limited by the manner in which the EAS tag assembly is manufactured.

Yet, another important aspect of the present invention is that the design of the EAS tag assembly 50 will allow for only one portion to be active at a given time. Thus, when the tag is activated for AM, it is deactivated for RF. This is coincident with the intrinsic properties of the labels themselves, as expressed:

|  | AM | RF |
| --- | --- | --- |
| Activation | Magnetize | De-magnetize |
| De-Activation | De-magnetize | Magnetize/RF Shorting |

Thus, in a preferred embodiment, the resonator component (which may be formed from Metglas or from many of the known amorphous alloys, used for the magnetorestrictive resonator) will be employed as not only the resonator in the AM subsystem, but may be a layer or a portion of a layer of the RF subsystem. The bias magnet 62 may also be a layer or a portion of a layer.

Moreover, the resonator component can also be effective for EMF shielding. As such, when a shield is placed behind the RF component, the signal from the RF is not absorbed by the package that it is trying to protect, but is directed outward toward the EAS gate which is meant to detect the signal. The shielding aspect can coexist with the actual performance of both the AM and the RF components when the RF circuit is designed and tuned to accommodate the interaction between the two. However, as stated previously, the means and location of the AM portion in relation to the RF portion will effect the advantage of shielding properties.

Figure 10:
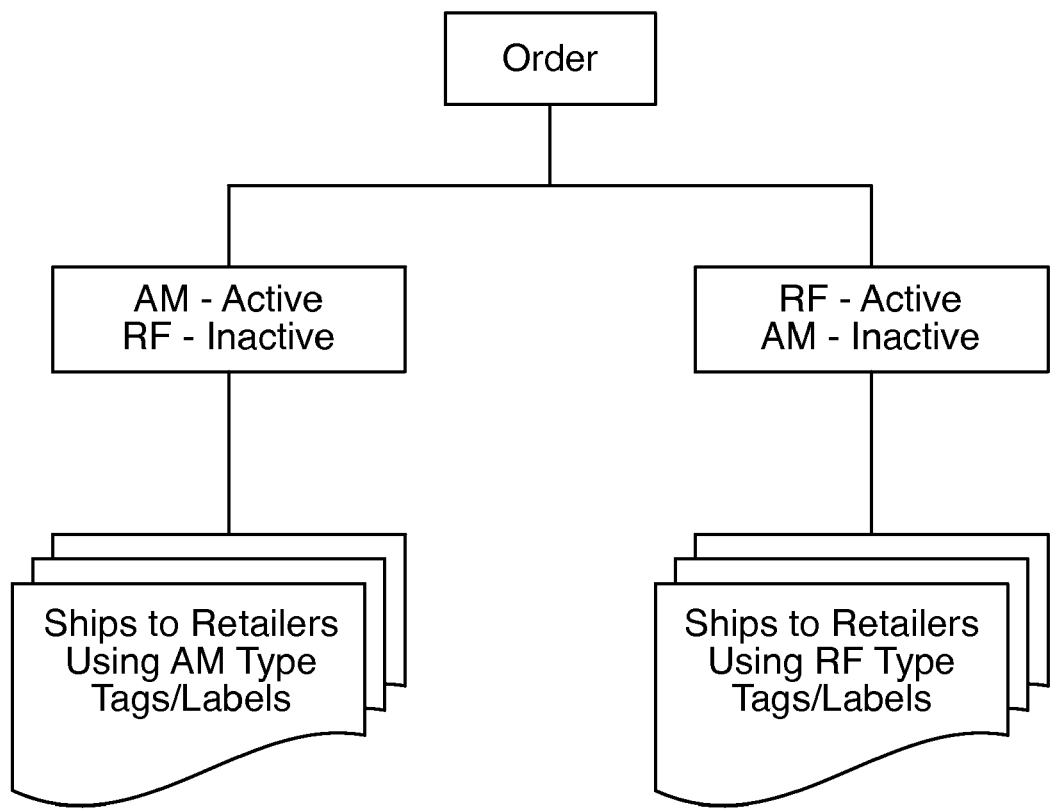
FIG. 10 illustrates a flow diagram showing the selective activation/deactivation of either the AM or RF portions of the combined EAS tag/label assembly shown in FIGS. 8-9.

It will therefore be readily appreciated that with the combined EAS tag assembly 50, a manufacturer can incorporate the label/tag 50 into a product or packaging during manufacture and maintain a single inventory. When the order for a product comes in, the products are picked and then the appropriate AM or RF component is activated/deactivated. This can be done automatically on a conveyor system or individually. A flow chart depicting the simplicity of this is shown in FIG. 10.

Thus, a preferred embodiment of the present invention provides an integrated EAS label/tag assembly 50 which is compatible with both AM type and RF (including RFID) systems. The invention includes the AM type transponder which is composed of one or more amorphous alloys strips with a high magnetic permeability and a magnetic biasing strip which can be cast, die cut, painted, printed, etc . . . The amorphous strip(s) are packaged such that it (they) can freely resonate and is (are) sized to resonate at the desired frequency of standard AM type EAS.

The invention also includes the RF (or RFID) component which can be manufactured by any number of known processes. The process of die cutting or laser cutting the material is the preferred method (however, any number of methods may be used), since it minimizes the steps of manufacture, amount of equipment and eases the capability of mass producing a fine tuned RF type EAS tag exhibiting the rectangular shape with open space in its center and/or for fine tuning the interaction between the components regardless of their location and RF antenna type. An open space is preferred when combining the two types of tag/labels (AM and RF) to maximize shielding effects. However, the open space is not necessarily to create a highly functional combined/universal tag, which provides the business benefit of reducing inventory and the associated costs.

Moreover, The RF subsystem of the combined EAS tag/label assembly 50 is characterized as a LC Tank Circuit where the angular frequency is equal to:

$$\omega = F_{ang} = \sqrt{\frac{1}{LC}}$$

in radians/sec; where L is in Henries and C is in Farads;
Resonant Frequency is equal to:

$$\omega = F_{res} = \sqrt{\frac{1}{LC}}$$

in radians/sec; where L is in Henries and C is in Farads;
Measured in Hertz $$F = \frac{\omega}{2*\pi} = \frac{1}{2*\pi*\sqrt{LC}}$$

The AM subsystem of the combined EAS tag/label assembly 50 is characterized by one or more strips or ribbons of an amorphous magnetorestrictive alloy, which is magnetically biased by the placement of the bias magnet. The resonator(s) provide consistent resonant frequency when a given bias field is applied. Although it is common to have multiple resonators, the design of the present invention does not preclude the use of a single resonator or multiple arrangement. In simplistic terms, resonators of the same thickness can be accomplished as long as the length is constant and total width is approximately the same. For approximation, if a single resonator can be designed with a length of approximately 38 mm and a width of 2×, two individual resonators of the same length can be used with a width of x, assuming consistent thickness.

The combined RF (including RFID) and AM label/tag provides the overall system with not only a less expensive means of manufacturing these labels/tags independently, but provides a potential improvement in performance and product shielding. Depending upon the position of the AM portion in relation to the RF portion, shielding may be improved. The resonators, being an amorphous alloy, are intrinsic shielding materials. Customized designs following this method allow that the RF signature will not be absorbed by the product being labeled, since the amorphous alloys used as resonators in the AM tag will shield the product and reflect the signal outward in the desired direction.

It is therefore an important aspect of the present invention that the combined EAS tags described in connection with the embodiments of FIGS. 5-10 each contain at least a first and a second circuit portions, each of which are capable of excitation (or 'interrogation', by a suitable reader/writer) by separate technological protocols. Thus, a combined EAS tag/label assembly is created which may properly communicate with any number of differing interrogation protocols, regardless of the technology protocol of the interrogator/reader.

It will also be appreciated that the disclosed embodiments as presented in connection with FIGS. 5-10 are not limiting in the nature of the EAS circuitry integrated in the combined EAS tag/label. That is, any number or differing types of EAS circuitry, in existence now or developed in the future, may be integrated onto a common substrate of an EAS tag/label, without departing from the broader aspects of the present invention. Moreover, although the present invention envisions integrating differing types of EAS circuitry onto a common substrate, each being capable of excitation/interrogation by the appropriate interrogation protocols, the combined EAS tag/label of the present invention seeks to utilize at least one common element, or component, between the differing EAS circuitry. In this manner, a reduction in the overall size and cost of the combined EAS tag/label assembly of the present invention is realized.

Figure 11:
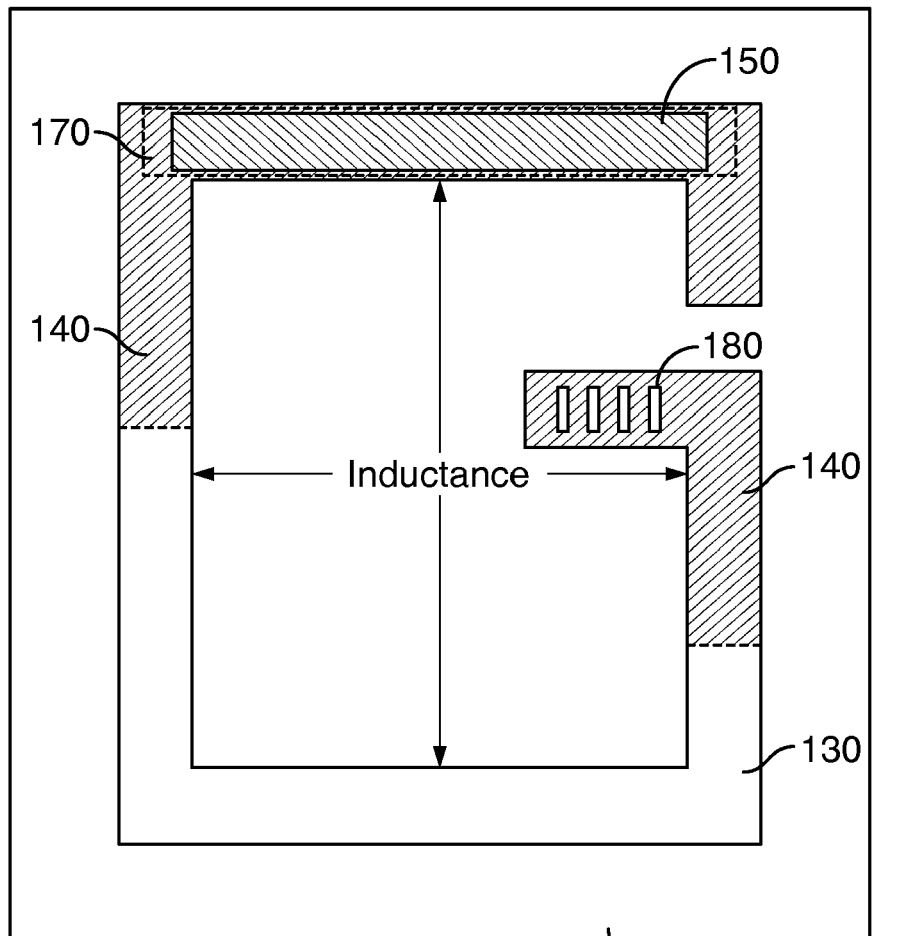
FIG. 11 illustrates a schematic view of a universal tracking assembly in accordance with an alternative embodiment of the present invention.
Figure 12:
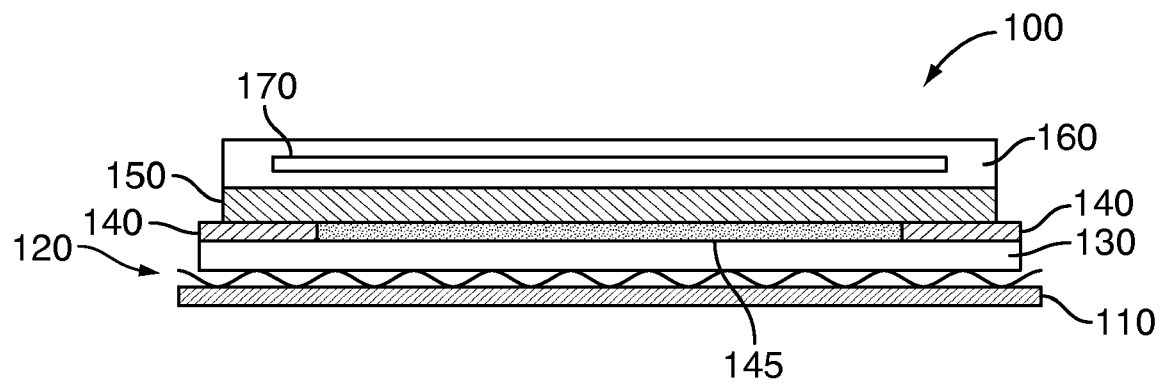
FIG. 12 illustrates a side view of the universal tracking assembly of FIG. 11.
Figure 13:
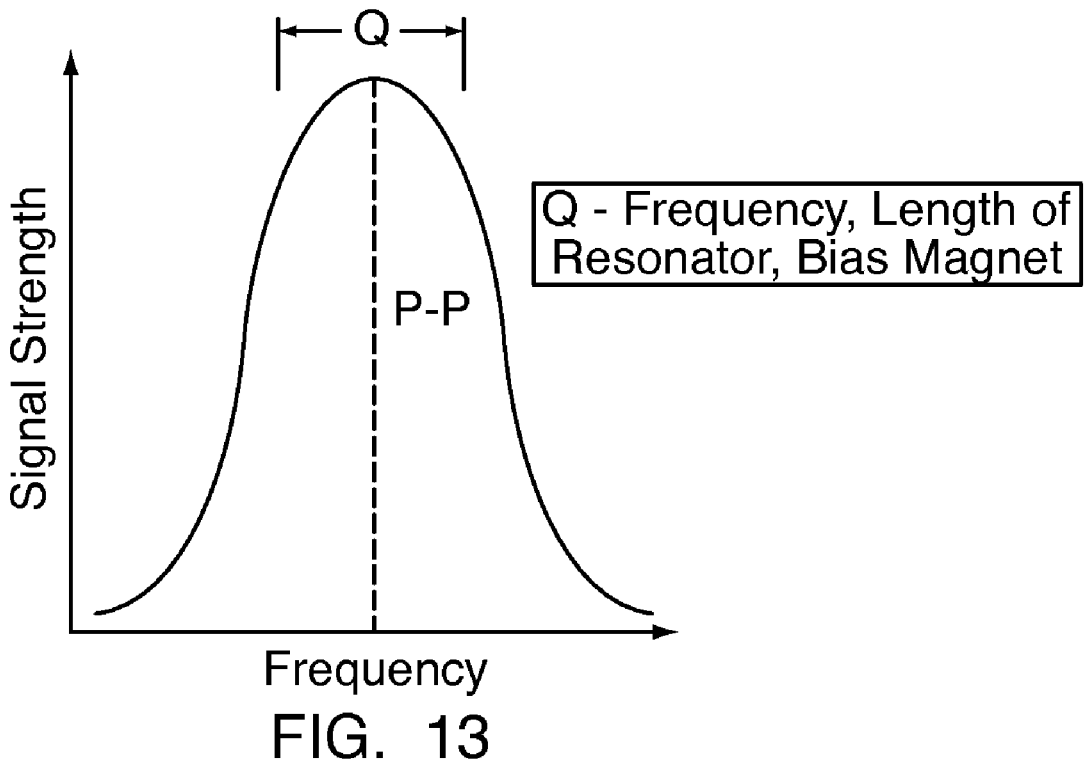
FIG. 13 illustrates a graph depicting a Q value associated with the universal tracking assembly of FIG. 11.

Referring now to FIGS. 11-13, an alternative embodiment of the inventive tracking assembly is disclosed. More specifically, the depicted embodiment is an EAS tracking tag/label that includes both an RF circuit and an AM circuit in a single, stacked hybrid assembly. The stacked configuration of the hybrid RF/AM assembly is facilitated through the use of a bias magnet as a shared component between the RF and AM circuits.

As shown in FIGS. 11 and 12, the inventive tag 100 includes a substrate 110. As will be appreciated, the substrate 110 may be manufactured from a variety of materials including paper and the like. The substrate 110 has an adhesive layer 120 (FIG. 12), which secures the hybrid RF/AM circuit to the substrate 110. The substrate 110 may also have an attachment surface or backing 115 with a peel-off layer allowing the substrate 110 to be secured to a package.

Affixed to the substrate 110 is a coil inductor 130 of the RF circuit, which as discussed above, is an LF tank circuit. As shown, a portion of the coil inductor 130 is overlapped by another section of foil or magnetic ink, thereby forming a plate capacitor 140. As mentioned, the capacitor 140 is preferably a second layer of foil that has been secured to the inductor 130 with dielectric glue. The capacitor 140 also has a plurality of cut-away portions 180 which can be broken or blown out with high-energy RF to disable the RF portion of the inventive tag should the tag be for use with AM readers exclusively.

The coil inductor 130 may itself be manufactured from a foil or a metallic ink. Preferably, the coil inductor 130 is foil and is manufactured using a die cut process in which the inductor 130 and capacitor 140 are cut from a single piece of foil. When cut from a single piece of foil, the die cut foil would include a fold line allowing the 'capacitor' portion 140 to be folded over the 'inductor' portion 130, and glued in place. The size of the inductor 130 may vary provided that it has a width large enough to accommodate the bias magnet and the resonator strips of the AM circuit, as will be discussed in more detail below.

Referring again to FIGS. 11 and 12, the coil inductor 130 has a layer of dielectric material 145 separating it from a bias magnet 150. The bias magnet 150 is preferably a unitary single piece magnet and, as is known, is typically employed in AM-type EAS tags. While a single-piece magnet has been described, the present invention is not so limited in this regard, as the magnet may alternatively be formed as a multi-piece structure, without departing from the broader aspects of the present invention. Indeed, a primary concern is that the magnetic component evidence two spaced apart poles, regardless of the specific structure of the bias magnet 150. Moreover, and with respect to employing spaced apart poles, the poles being located on a portion of the inductor and capacitor, a substantial cost savings may be realized over the use of a single piece bias magnet, as less magnetic material would obviously be required.

In its preferred configuration, however, the bias magnet 150 is a single unitary 38 mm×4 mm Arnochrome permanent magnet that is situated so that it overlaps, in superposition, both a portion of the inductor 130 and plate capacitor 140 on top of the inductor 130. Importantly, in this location, the bias magnet 150 increases the capacitance of the RF circuit and becomes, in essence, part of the capacitor 140. Indeed, the area of overlap between the plate capacitor 140 and inductor 130 can be reduced or expanded in accordance with the size of the bias magnet 150 to achieve a desired resonance frequency.

As will be appreciated, the bias magnet 150 is a preferred shared component between the RF circuit and the AM circuit in the inventive hybrid assembly of the present embodiment. The AM portion of the assembly includes the bias magnet 150 and multiple resonator strips 170 located within an insulative bubble-type enclosure or pack 160, preferably manufactured from plastic. The resonator strips 170 may be formed from Metglas or from many known amorphous alloys. The bubble pack 160 is insulative so that the resonator strips do not affect the capacitance of the RF circuit. Preferably, the bubble pack 160 is secured to the bias magnet 150 by gluing the edges of the pack 160 directly to the bias magnet 150.

The use of the bias magnet 150 in the RF circuit is an important aspect of the present invention. The bias magnet 150 effectively increases the capacitance of the RF circuit, while also allowing the AM portion to be stacked directly on top of the RF portion without destroying the functioning of either the AM or RF portions of the universal tracking tag/assembly 100.

Indeed, simply mounting an AM circuit and RF circuit, in close association on the same tag substrate, serves to interfere with the capacitance of the RF circuit, e.g., thereby reducing the resonance frequency from the (e.g.) required 8.2 MHz, and potentially rendering both circuits unsuitable for use.

In sharp contrast, the present invention has determined that by employing the bias magnet 150 (a necessary component of known AM circuitry) in a superpositional orientation over the existing coil inductor of the RF circuitry, the bias magnet 150 actually performs a dual function without harming the operational characteristics of either the AM or RF portions of the universal tag/assembly 100. Thus, an important aspect of the present invention lies in utilizing the biasing magnet 150 of known AM circuitry to act also as a capacitive element for a RF EAS tag, by locating the bias magnet 150 in superposition over at least a portion of the coil inductor of the RF circuitry.

In addition to the concept of integrating the bias magnet 150 in the manner discussed above, it is yet another important aspect of the present invention that the length of the bias magnet may itself be varied in order to alter the total capacitance of the RF circuit, i.e., in order to 'tune' the circuit. This eliminates the need to alter the amount of overlap between the foil capacitor and the induction coil, which is more difficult to vary upon manufacture than is the length of the baising magnet, which is a separate component placed on top of and affixed to the previously manufactured and assembled substrate, inductor and capacitor.

Additionally, the present invention also contemplates that it is possible to simply change the position of the bias magnet 150, relative to the capacitor and inductor portions of the universal tag/assembly 100, so that only a predetermined portion of the bias magnet overlaps these components to alter the capacitance of the RF circuit. For the above reasons, the inventive tag provides an ease of manufacture, and a degree of versatility, previously unknown in the art.

The ability to easily tune the inventive EAS tag/assembly 100 is important, particularly in situations where the specific packaging of a commodity is known to bring an RF tag out of tune. For example, with tobacco products such as cigarettes, the packaging typically includes a foil paper lining. This foil lining affects the capacitance of an RF circuit effectively throwing an RF EAS tag out of tune and rendering it ineffective for its intended purpose. Therefore, separate RF tags are typically manufactured specifically for such packaging, and the resultant customization of such packaging obviously increases the cost of manufacture, as well as increasing the complexity of selecting the proper RF EAS circuitry for the specific commodity being shipped.

Thus, it is yet another important aspect of the present invention that the length of the bias magnet can be selectively altered, thereby changing the capacitance of the RF circuit to take into account the foil lining of the packaging such that the tag 100, when placed on such packaging, provides the proper resonance frequency of 8.2 MHz. This relatively simple modification does away with the need to manufacture a plurality wholly separate tags, for use with a matching plurality of differing commodities that each have their own 'capacitance profile', due to foil packaging or the like.

Alternatively, it is also possible to create a hybrid AM/RF tag for packaging that includes a foil lining by placing a bias magnet in the center of the induction coil where it does not overlap the capacitor and coil. This configuration provides shielding from the deleterious effects of the foil lining though it also increases inductance, which must be accounted for by altering capacitance to tune the circuit so that it is effective.

As stated, the hybrid inventive circuit/assembly 100 may be tuned by selectively varying the length of the bias magnet 150. Typically, both RF and AM circuits are tuned, e.g., the capacitance and inductance are modified, to result in a maximized "Q" value (FIG. 13). The Q is a measure of quality of the resonant frequency of a circuit. FIG. 13 graphically depicts an idealized Q value with a high peak to peak (P-P) value 200 over a relatively narrow frequency range. Varying the length or overlap of the bias magnet can tune the hybrid AM/RF circuit until optimal Q values are obtained for both the RF and AM portions of the circuit.

Turning back to the stacked configuration of the hybrid RF/AM circuit, it will be appreciated that this configuration is a significant feature of the present invention. There are literally millions of EAS tags deployed by manufacturers, distributors and retailers for inventory tracking and control. Given the high volume of tags, cost savings, ease of manufacture and universal adaptability are of particular importance. With these goals in mind, the stacked hybrid assembly with its shared bias magnet allows for the creation of a single tag with both RF and AM circuits.

In particular, the inventive hybrid assembly 100 of the present invention provides for a significant savings as it eliminates the need for separate RF and AM tags. For example, where the type of EAS reader/interrogator varies from location to location during shipment and sale of goods, it is known to place two wholly separate tags on a package, e.g., one for an RF reader and another for an AM reader. As will be apparent, the deployment of separate tags requires the manufacture and deployment of separate tags. The present invention reduces these costs through the use of a single tag with a hybrid AM/RF circuit.

In addition to reducing costs, the use of a single tag with the inventive hybrid circuit provides a level of adaptability and convenience not available with known EAS tags. Indeed, the hybrid tag, and any accompanying packaging, may be shipped with only the RF circuit activated, the AM circuit activated or both the AM and RF circuits activated. This is important in that it allows a single tag to be configured for multiple applications. That is, the RF circuit, for example, may be permanently disabled with a burst of high-energy RF signal where it is known that the tag will be used only on packages encountering AM readers during shipment and sale to consumers. Alternatively, the tag could be deployed with the RF circuit activated and the AM circuit not magnetized, i.e., inactive, where only RF readers are present. In this scenario, the AM circuit may be magnetized and activated after the tag has been deployed if necessary. Finally, the tag may be deployed with both the RF and AM portions active and magnetized, respectively.

Further, while the present embodiment is an AM/RF hybrid tag that is "passive", i.e., is incapable of transmitting data itself, merely providing a response (or not) to an interrogating AM or RF signal, it is possible to create other, more complex hybrids using a bias magnet as a shared component between circuits. For example, an AM/RFID hybrid may be created in which an IC/processor, power source and antenna are added to the present arrangement of components. This configuration would allow for the inventive tag to store and potentially transmit additional information apart from the active/inactive information available with exemplary AM/RF hybrid. Thus, with the inclusion of an IC/processor, it is possible for the hybrid/universal tag 100 to actually broadcast product and shipping information, similar to known RFID tags, when interrogated via AM or RF protocols.

It is also possible for the above-described AM/RF tag 100 to function as, or mimic, an RFID tag, even without the inclusion of an IC/processor. This may be accomplished through the placement of multiple resonator strips of varying lengths, and frequencies, in the bubble pack 160. As will be appreciated, different resonator strips, each representing differing types of information, e.g., active/passive, manufacturing location, etc., and having a specific resonant frequency, may be stored within the bubble pack 160 for subsequent AM interrogation. It may also be possible to create resonator strips that have coatings (e.g., organic coatings) that only resonate when certain, very specific conditions cause the organic coatings to deteriorate. In this manner, a plurality of interrogation signals can be broadcast at the hybrid tag/assembly 100, utilizing AM protocols, and the cumulative effect of receiving or not receiving a corresponding signal from each of the resonator strips in the bubble pack 160 effectively mimics the broadcast of multiple data bits from an integrated IC or processor.

Referring generally to FIGS. 1-15, the present invention also contemplates a method of shipping and tracking inventory using the above-described tags. In particular, the invention contemplates a method in which a specific type of tag is selected for placement on an item to be shipped based on criteria such as an analysis of a shipping route for the item and the type of tag readers the item will encounter at interrogation points along its route.

The inventive method typically commences with the receipt of an order for a specific product to be delivered to a final destination, e.g., a retail location. Once the order information is received, an appropriate shipping facility, e.g., a retailer warehouse, is selected.

As will be appreciated, the selection of the shipping facility may be based upon its proximity to the retail location and the quantity of the product that is to be delivered, or other pertinent factors.

Once an appropriate shipping facility has been selected, a shipping route is determined for the product. In particular, location data for the route is accessed. The location data includes information regarding the type of reader at each stop or point on the route wherein the product is interrogated.

Product data is also accessed at a separate step. This data includes information regarding whether the product requires a specific type of tag or, depending on the value, content or size/shape of the item, whether it requires a tag at all. For example, tobacco products, such as cigarettes, include a foil paper lining that may require either a separate RF tag manufactured specifically for such packaging or a specifically tuned hybrid tag such as those disclosed herein.

When the location data and product data have been accessed, a decision regarding the most appropriate tag or tags to be placed on the product packaging can be made. That is, a tag is selected based on the type of reader the product will encounter at each interrogation location along the shipping route, including the reader at the store destination, and any specific tag requirements dictated by the type of product being shipped.

For example, if a product is to encounter only RF readers in transit, and has no special tag requirements, an RF-only tag is placed on the product prior to shipment. Likewise, if product is to only encounter AM readers, then an AM-only tag may be placed on the product. If a product is to encounter multiple types of readers, then a hybrid AM/RF tag, such as the tag disclosed herein, may be utilized.

The ability to select the type of tag based on criteria such as shipping route and product data is an important aspect of the present invention. By using the inventive method, overall shipping costs associated with a retailer's inventory shipments can be reduced.

More specifically, EAS tag costs vary by type of tag and the inventive hybrid tag may, for example, be more expensive than an AM or RF only tag. Therefore, shipping costs may be reduced by deploying a hybrid tag only in situations where it is necessary, e.g., where a product will be interrogated by both AM and RF readers along its shipping route, or where a specific tag is necessitated by the type of product shipped, and using the ostensibly cheaper AM- or RF-only tags when appropriate.

Figure 14:
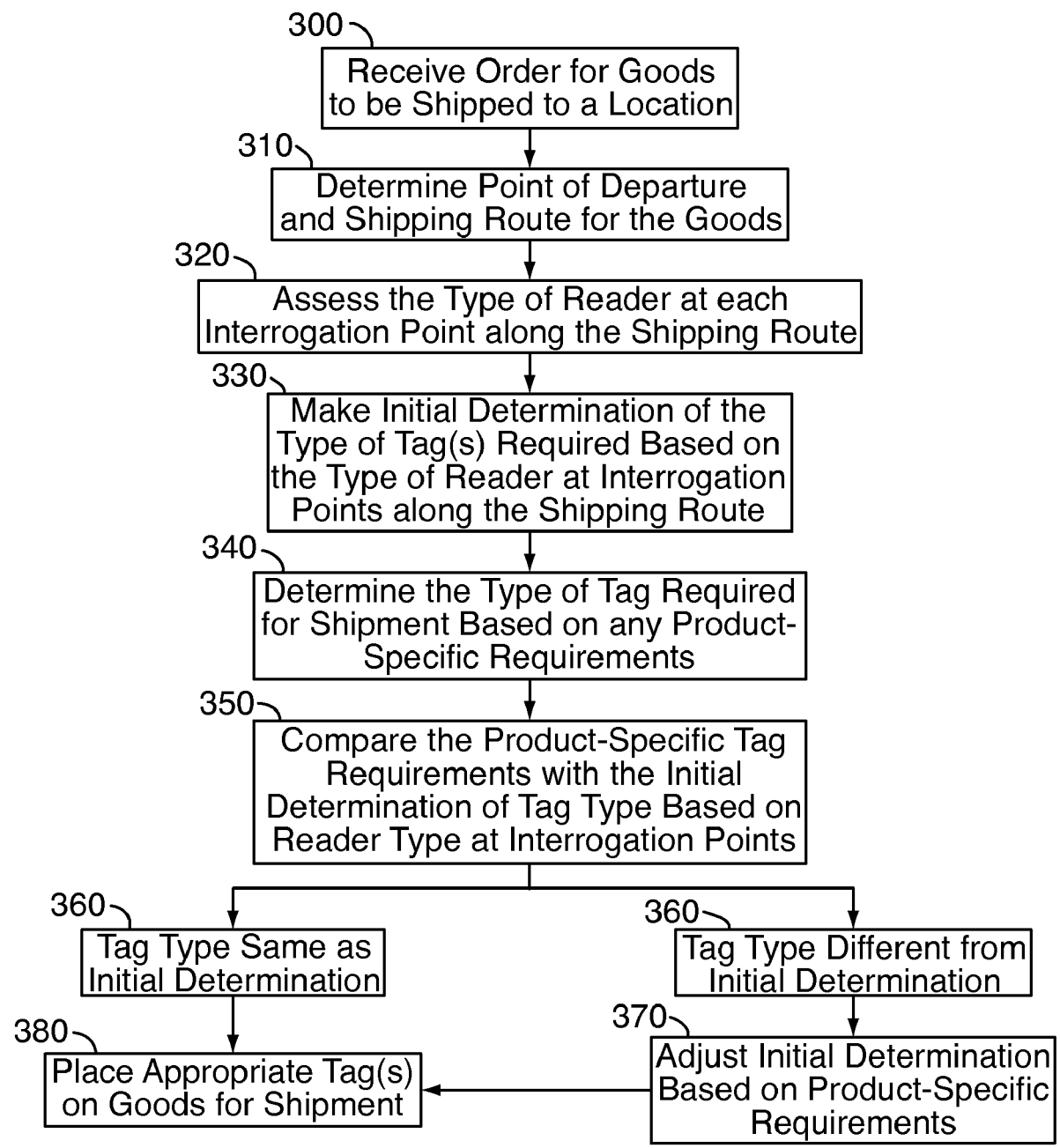
FIG. 14 is a flow diagram depicting a method of shipping and tracking inventory in accordance with an embodiment of the present invention.

This method is graphically depicted in the flow chart of FIG. 14. As shown, at step 300, a retailer or shipper receives an order for a delivery of goods to a specific destination. The point of departure and shipping route for delivery of the goods is then determined at step 310.

At step 320, a locations database is then accessed to determine the type of reader at each stop or point of interrogation along the shipping route.

After the type of reader at each interrogation point on the shipping route has been determined, an initial determination regarding the type of tags required for shipment is made at step 330. The product database is then accessed to determine whether there are any product-specific tag requirements (step 340). At step 350, the initial determination on the type of tags required obtained at step 330 is then cross-referenced or compared to the product-specific tag type results obtained at step 340 to select the appropriate type of tag or tags necessary to ship the given product.

In particular, a determination is made at step 360 as to whether the results of step 340 are different from the results of step 330. If they are different, an adjustment (step 370) is made to the initial determination to account for the product specific requirements. An appropriate tag, or tags, may then be placed on the goods (step 380).

If the results of the initial determination are the same as the results of the determination based on product-specific tag type requirements, an appropriate tag may be placed on the goods at step 380.

While the above method is described with the locations database being accessed first to determine tag type based on a shipping route, it will be apparent that the product database may be accessed first to determine specific tag requirements for a certain product. Indeed, the inventive method and system contemplates a user being able to selectively prioritize the sequence of databases or criteria reviewed to determine tag type.

Moreover, as will be appreciated, decisions regarding the selection of appropriate tags are based, in part, on the relative cost of the tags. If, for example, a product requires both AM and RF tags, it is contemplated that the inventive hybrid AM/RF tag would be deployed, as a single hybrid tag is less expensive than affixing individual AM and RF tags to a product.

In addition, if individual AM or RF only tags were for some reason more expensive then the inventive AM/RF hybrid tag, or not readily available, the AM/RF hybrid tag could be used in all situations and be selectively activated depending on the readers encountered along the shipment route.

In other words, instead of selecting a specific type of tag in response to location and product information, the inventive AM/RF hybrid tag can be activated depending upon the type of readers a product will encounter and the product type. That is, either the RF circuit, the AM circuit, or both the AM and RF circuits may be activated via magnetization. Conversely, the RF circuit, for example, may be permanently disabled with a burst of high-energy RF signal where it is known that the tag will be used only on packages encountering AM readers during shipment.

Figure 15:
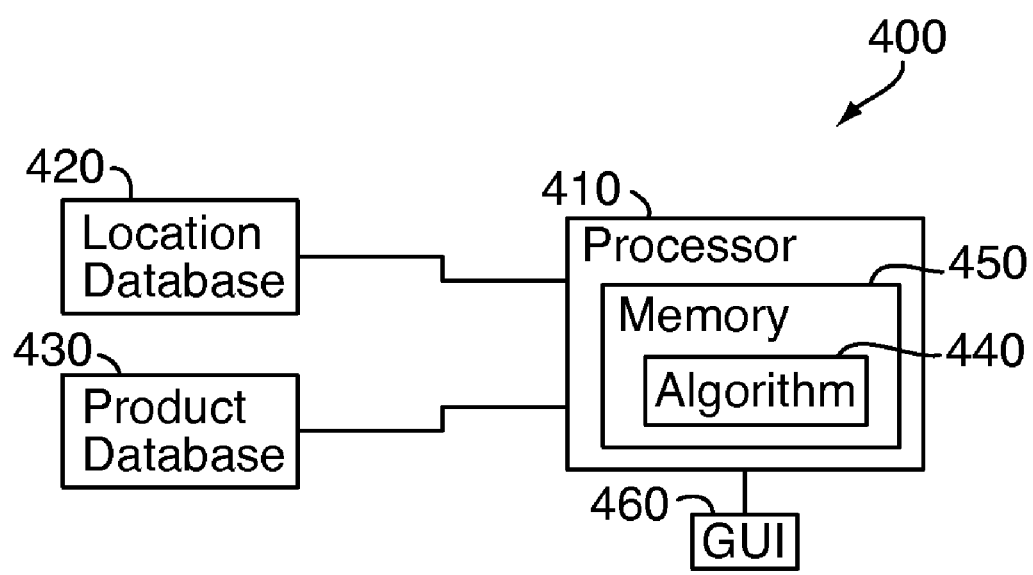
FIG. 15 graphically illustrates a system by which the method of FIG. 14 may be utilized.

Referring now to FIG. 15, the inventive method is accomplished through the use of a system 400 that includes a processor 410 in communication with multiple databases. The databases include the aforementioned location database 420 and product database 430. As discussed, the location database 420 includes data on the type of reader at all locations or points through which a shipped product must pass from its initial point of departure to its final destination along a shipping route. The product database 430 includes data regarding specific tag requirements for specific types of products, e.g., whether a special tag is needed for a tobacco product.

The processor 410 executes an algorithm 440 which resides in memory 450 associated with the processor 410 to carry out the steps of the inventive method and select the most appropriate type of tag for a product to be shipped. In particular, it is envisioned that a user of the inventive system will enter data regarding the type of product to be shipped as well as the point of departure and final destination into the processor 410 via a GUI 460.

As will be appreciated, the point of departure may also be determined by the inventive system by allowing the processor to access inventory and warehouse data in a separate database so that a location that has a sufficient quantity of the product to be shipped, and/or is in close proximity to the final destination, may be selected. Likewise, a sub-routine of the inventive system may determine the most appropriate shipping route based on the point of departure and final destination. This information may also be obtained from a source external to the inventive system and manually entered via the GUI.

Additionally, a separate database (not shown) may contain a compilation of all known shipping routes, be they air, ground, or sea. This database would be in operative association with the processor and other databases and would operate in concert with the location database to map out the types of readers at interrogation points along a shipping route.

Once entered, the processor 410 accesses the locations database 420 and obtains data on the type of reader at each point of reader interrogation along the route. The processor 410 then determines the type of tag(s) necessary for shipment based on this data.

The processor 410 then accesses the product database to determine whether the specific product to be shipped has any specific tag requirements. If so, the processor 410 will adjust the result obtained from the locations database 420. For example, if the product will encounter AM readers along its shipping route but the particular product does not require a tag, then the initial determination of an AM tag will be revised to a result of no tag necessary.

The system may also receive information regarding the types of tags available for use at the point of departure. That is, if the only tag available is the inventive hybrid, the system can instruct a user as to whether the AM, RF or both components of the hybrid tag are to be activated based on the above criteria. Similarly, the inventive system may also monitor quantities of specific tags available for deployment and notify a user when a quantity is low and should be replenished.

Moreover, the system can preferably self configure based on quantities of tags available. That is, if the shipping facility runs out of AM only tags, then when such a tag is required, the system will specify an AM/RF hybrid tag as an alternative.

As will be appreciated, the present system and method is not limited to the exemplary criteria used to determine tag type. For example, colored tags may be selected based on a color of the packaging of the product to be shipped. Likewise, the present invention contemplates weighing and sequencing the criteria used to determine tag type based on user preference and is not limited to a specific formula.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

I claim:

1. A method of shipping and tracking inventory, said method comprising the steps of:
   selecting at least one type of EAS tag for placement on a product to be shipped based on at least one shipping criteria;
   wherein said at least one type of tag is selected by a processor and said shipping criteria resides within a database electrically connected to said processor; and
   wherein said shipping criteria is a determination of a shipping route of said product to be shipped.

2. The method of claim 1 wherein said shipping criteria is a type of EAS reader utilized at an interrogation point on said shipping route.

3. The method of claim 1 wherein said shipping criteria is determined by the specific type of product being shipped.

4. The method of claim 1 wherein said shipping criteria is a type of EAS reader utilized at a final destination for said product.

5. The method of claim 1 wherein said at least one type of EAS tag is at least one of an RF tag, an acousto-magnetic (AM) tag or a hybrid RF/AM tag.

6. The method of claim 1 further comprising the step of:
   placing said selected at least one type of EAS tag on a product to be shipped.

7. Electronically-readable media tangibly embodying a program of instructions executable by a processor to perform a method of shipping and tracking inventory, the method comprising the steps of:
   selecting at least one type of EAS tag for placement on a product to be shipped based on a shipping criteria; and
   wherein said at least one type of EAS tag is selected by a processor and said shipping criteria resides within a database electrically connected to said processors;
   wherein said shipping criteria is a determination of a shipping route of said product to be shipped.

8. The electronically-readable media of claim 7 wherein said shipping criteria is a type of EAS reader present at interrogation points on said shipping route.

9. The electronically-readable media of claim 7 wherein said shipping criteria is determined by the specific type of product being shipped.

10. The electronically-readable media of claim 7 wherein said at least one type of EAS tag is at least one of an RF tag, an acousto-magnetic (AM) tag or a hybrid RF/AM tag.

11. A system for the shipping and tracking of inventory, said system comprising:
    a first database containing a first criteria used to select at least one type of EAS tag to be affixed to a product to be shipped;
    a second database containing a second criteria used to select at least one type of EAS tag to be affixed to a product to be shipped; and
    a processor electrically connected to said first and said second databases, said processor selecting at least one type of EAS tag using said first and second criteria from said first and second databases and then comparing selected EAS tags to assess and resolve any differences between selections so that appropriate EAS tags may be affixed to said product to be shipped;
    wherein said first criteria is a shipping route of said product to be shipped.

* * * * *